J. PERKINS.
PLUMB BOB APPARATUS.
APPLICATION FILED MAY 29, 1916.
1,230,074.
Patented June 12, 1917.
Fig. 1.
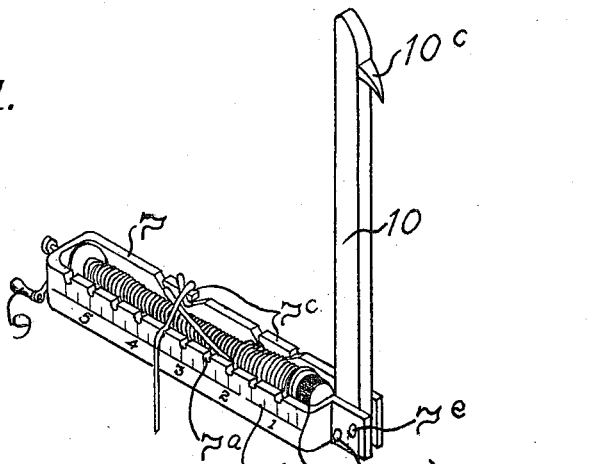
Fig. 3.
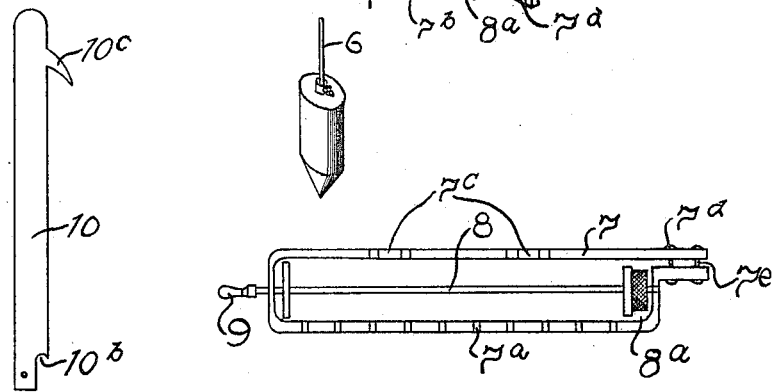
Fig. 2.
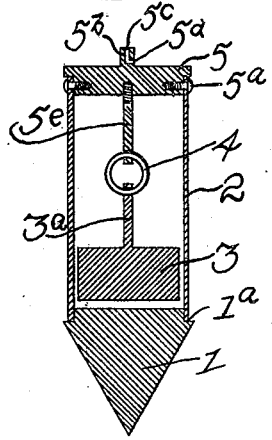
Fig. 4.
Inventor
Jonathan Perkins
By A. B. Bowman
Attorney.

UNITED STATES PATENT OFFICE.

JONATHAN PERKINS, OF SAN DIEGO, CALIFORNIA.

PLUMB-BOB APPARATUS.

1,230,074.	Specification of Letters Patent.	Patented June 12, 1917.

Application filed May 29, 1916. Serial No. 100,563.

*To all whom it may concern:*

Be it known that I, JONATHAN PERKINS, a citizen of the United States, residing at San Diego, in the county of San Diego and State of California, have invented certain new and useful Improvements in Plumb-Bob Apparatus, of which the following is a specification.

My invention relates to plumb bob apparatuses, and the objects of my invention are: first, to provide a new and novel construction of plumb bob which will quickly reach its equilibrium when suspended; second, to provide a plumb bob of this class which is simple and economical of construction, durable and will not readily get out of order; third, to provide a plumb bob of this class with means for supporting said plumb bob relatively to the thing to be plumbed; fourth, to provide a means of this class in which the plumb bob may be suspended in certain position and remain in such position for a considerable length of time; fifth, to provide a device of this class with means thereon for readily ascertaining the distance the suspension point is from the thing to be plumbed so that the distance from the suspended plumb bob to said thing may be measured in plumbing certain structures.

With these and other objects in view as will appear hereinafter my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a perspective view of my apparatus complete showing the plumb bob suspended. Fig. 2 is a top view of the support, with the cable, plumb bob and engaging means removed to facilitate the illustration. Fig. 3 is a side view of the engaging means and Fig. 4 is a sectional view of my specially constructed plumb bob.

Similar characters of reference refer to similar parts throughout the several views.

The plumb bob point 1, casing 2, pendulum 3, ring 4, cap 5, cable 6, support frame 7, spool 8, crank 9 and engaging member 10 constitute the principal parts of my plumb bob apparatus.

The point 1 is an inverted cone, preferably made of solid metal. It is provided around its upper edge with a cut away portion 1ª adapted for the cylindrical casing 2 which is preferably secured thereto by sweating. Mounted in the top end of this casing 2 is the plug 5 and secured thereto by means of the screws 5ª. Mounted on the top of this plug 5 is a lug 5ᵇ which is provided with a vertical hole 5ᶜ therein and with a horizontal hole 5ᵈ near the bottom of said lug extending therefrom and communicating with the outside thereof. These holes 5ᵉ are adapted for the cable 6, the end of the cable extending out through the hole 5ᵈ and a knot is tied at the end thereof for connecting the plumb bob to the cable. Mounted centrally in the lower side of the plug 5 is a rod 5ᵉ which is provided with a hole in its lower end adapted for the ring 4 and also mounted on said ring by means of a hole therein is the lug 3ª which extends from the pendulum 3 so that there is a free movement of the pendulum 3 on the plug 5 by means of the rod 5ᵉ, ring 4 and lug 3ª. The other end of the cable 6 is secured to the spool 8 and wound thereon by means of the crank 9. This spool is revolubly mounted in the supporting frame 7 and said spool is provided with a knurled member 8ª adapted to facilitate the regulation of the revolution of the spool 8 by the pressure of the thumb of the operator on said knurled member 8ª. The support 7 is provided along the top edge of one side with a plurality of notches 7ª which are spaced apart an equal distance preferably one-half inch apart and the first one from the engaging member is preferably spaced one inch from that end of said support and along said side is provided a scale 7ᵇ adapted to permit the operator to readily determine the distance the cable 6 is supported on the supporting frame 8 from the building or wall which is to be plumbed. Mounted on the opposite side of the frame 7 are a pair of lugs 7ᶜ notched in the top edge thereof adapted for a hitch for the cable as shown best in Fig. 1 of the drawings when the plumb bob has descended the proper distance and the cable rests in one of the notches 7ᵃ on the opposite side of the frame 7. Pivotally mounted in the supporting frame 7 by means of the bolt 7ᵈ is the engaging member 10 which is provided with a notch 10ᵇ in one side which is adapted to engage with the bolt 7ᵉ in the supporting frame 7 so that when in the open position shown in Fig. 1 of the drawings, engaging piece 10 will be at right angles to the top of the supporting frame 7. Mounted near the free end of the engaging member 10, on one side thereof is a prong 10ᶜ which is adapted to be pressed into the wall which is to be plumbed for supporting the rest of the apparatus. It will be here noted that the engaging piece 10 being pivotally mounted will turn down beside the spool 8 when not in use so that the supporting portion of the apparatus will occupy but a small space when not in use.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

It is obvious that with this construction there is provided a plumb bob apparatus in which the plumb bob will quickly reach its equilibrium when suspended, that the independent movement of the pendulum against the inner sides of the casing 2 will check the swing of the plumb bob thus aiding in its reaching its equilibrium, that the supporting portion of the apparatus provides for supporting the cable a certain fixed distance from the wall to be plumbed, that the cable 6 may be readily secured by means of the lugs 7ᶜ for supporting the plumb bob in any position desired below said support, that the engaging means provides means for readily securing the support to the wall and that the whole is simple and economical of construction, durable and will not readily get out of order.

Having thus described my invention what I claim as new and desire to secure by Letters Patent, is:

1. In an apparatus of the class described, the combination of a plumb bob, consisting of a cylinder, a pointed weight secured in the lower end thereof, a plug in the upper end thereof, a pendulum of slightly smaller diameter than the inner surface of said cylinder suspended centrally in said plug and adapted to swing against the inner sides of said cylinder, a cable secured to said plug for suspending said plumb bob and means for mounting said cable.

2. In an apparatus of the class described, the combination of a plumb bob, consisting of a cylinder, a pointed weight secured in the lower end thereof, a plug in the upper end thereof, a pendulum of slightly smaller diameter than the inner surface of said cylinder suspended centrally in said plug and adapted to swing against the inner sides of said cylinder, a cable secured to said plug for suspending said plumb bob and means for mounting said cable, consisting of a frame, a drum revolubly mounted therein upon which said cable is mounted and means for supporting said frame.

3. In an apparatus of the class described, the combination of a plumb bob consisting of a cylinder, a pointed weight secured in the lower end thereof, a plug secured in the upper end thereof, a pendulum suspended centrally on the lower side of said plug, the large portion being slightly smaller in diameter than the inner surface of said cylinder and adapted to strike against the inner side of said cylinder and means for suspending said pendulum consisting of a cable secured centrally on the outer surface of said plug, a drum upon which the other end of said cable is wound, a frame in which said drum is revolubly mounted and means for supporting said frame in a normally horizontal position against the structure to be plumbed.

4. In an apparatus of the class described, the combination of a plumb bob consisting of a cylinder, a pointed weight secured in the lower end thereof, a plug secured in the upper end thereof, a pendulum suspended centrally on the lower side of said plug, the large portion being slightly smaller in diameter than the inner surface of said cylinder and adapted to strike against the inner side of said cylinder and means for suspending said pendulum, consisting of a cable secured centrally on the outer surface of said plug, a drum upon which the other end of said cable is wound, a frame in which said drum is revolubly mounted, means for supporting said frame in a normally horizontal position against the structure to be plumbed and means on said frame for readily determining the distance said plumb bob is suspended from the structure to be plumbed.

5. In an apparatus of the class described, the combination of a plumb bob consisting of a cylinder, a pointed weight secured in the lower end thereof, a plug secured in the upper end thereof, a pendulum suspended centrally on the lower side of said plug, the large portion being slightly smaller in diameter than the inner surface of said cylinder and adapted to strike against the inner side of said cylinder and means for suspending said pendulum consisting of a cable secured centrally on the outer surface of said plug, a drum upon which the other end of said cable is wound, a frame in which said drum is revolubly mounted, means for supporting said frame in a normally horizontal position against the structure to be plumbed, means on said frame for readily determining the distance said plumb bob is suspended from the structure to be plumbed and means on said frame for engaging said cable whereby said plumb bob may be suspended at any elevation desired from the supporting frame.

In testimony whereof, I have hereunto set my hand at Los Angeles, California, this 20th day of May, 1916.

JONATHAN PERKINS.

Copies of this patent may be obtained for five cents each, by addressing the "Commissioner of Patents, Washington, D. C."